United States Patent
De Waele et al.

(10) Patent No.: US 9,183,883 B2
(45) Date of Patent: *Nov. 10, 2015

(54) METHOD AND SYSTEM FOR GENERATING DATA FOR CONTROLLING A SYSTEM FOR RENDERING AT LEAST ONE SIGNAL

(71) Applicant: Koninklijke Philips N.V., Eindhoven (NL)

(72) Inventors: Stijn De Waele, Croton on Hudson, NY (US); Ralph Antonius Cornelis Braspenning, Zundert (NL); Joanne Henriëtte Desirée Monique Westerink, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/079,858

(22) Filed: Nov. 14, 2013

(65) Prior Publication Data

US 2014/0072272 A1 Mar. 13, 2014

Related U.S. Application Data

(63) Continuation of application No. 13/132,950, filed as application No. PCT/IB2009/055465 on Dec. 2, 2009, now Pat. No. 8,604,328.

(30) Foreign Application Priority Data

Dec. 9, 2008 (EP) .................... 08171046

(51) Int. Cl.
*H04N 5/77* (2006.01)
*G11B 27/10* (2006.01)
(Continued)

(52) U.S. Cl.
CPC ................ *G11B 27/10* (2013.01); *A63J 17/00* (2013.01); *H04N 9/79* (2013.01); *H05B 37/029* (2013.01)

(58) Field of Classification Search
CPC ............ A63J 17/00; H04N 9/79; G11B 27/10
USPC ........................................ 386/228
See application file for complete search history.

(56) References Cited

U.S. PATENT DOCUMENTS 5,113,738 A 5/1992 Krucoff
6,548,967 B1 4/2003 Dowling et al.
(Continued)

FOREIGN PATENT DOCUMENTS

DE 19538436 A1 4/1997
EP 025619 A2 3/1988
(Continued)

*Primary Examiner* — Thai Tran
*Assistant Examiner* — Jose Mesa
(74) *Attorney, Agent, or Firm* — Meenakshy Chakravorty

(57) ABSTRACT

A method of generating data for controlling a rendering system (9) includes obtaining data representative of a recording of at least intervals of an event, the recording having at least two components (22,23) obtainable through different respective modalities. The data is analyzed to determine at least a dependency between a first and a second of the components (22,23). At least the dependency is used to provide settings (30) for a system (9) for rendering in perceptible form at least one output through a first modality in dependence on at least the settings and on at least one signal for rendering in perceptible form through a second modality.

20 Claims, 2 Drawing Sheets

(51) Int. Cl.
*A63J 17/00* (2006.01)
*H05B 37/02* (2006.01)
*H04N 9/79* (2006.01)

(56) References Cited

U.S. PATENT DOCUMENTS

| | | |
|---|---|---|
| 7,177,809 B2 | 2/2007 | Shioda et al. |
| 8,017,851 B2 | 9/2011 | Horovitz et al. |
| 2003/0025878 A1 * | 2/2003 | Fredlund et al. .................. 352/1 |
| 2003/0133292 A1 | 7/2003 | Mueller et al. |
| 2010/0300263 A1 | 12/2010 | Van De Sluis et al. |

FOREIGN PATENT DOCUMENTS

| | | | |
|---|---|---|---|
| EP | 1156610 A2 | 11/2001 | |
| FR | WO/2008/053409 | * 8/2008 | ............ H05B 37/02 |
| GB | 2398423 A | 8/2004 | |
| WO | 9736297 A1 | 10/1997 | |
| WO | 2007004097 A1 | 1/2007 | |
| WO | 2005084339 A2 | 5/2008 | |
| WO | 2008053409 A1 | 5/2008 | |

\* cited by examiner

METHOD AND SYSTEM FOR GENERATING DATA FOR CONTROLLING A SYSTEM FOR RENDERING AT LEAST ONE SIGNAL

FIELD OF THE INVENTION

The invention relates to a method of generating data for controlling a rendering system, a system for generating data for controlling such a rendering system, and a computer program.

BACKGROUND OF THE INVENTION

WO 2005/084339 discloses an apparatus for controlling a lighting system in response to an audio input. A mapping facility can be provided with a lighting program (e.g. stored in a mapping (able) that can include one or more variables to receive input values at execution time. The mapping facility can receive the output of an audio decoder, so that information concerning the characteristics of the input audio signal can be provided to the mapping facility to provide the input values for variables in the lighting program executed by the mapping facility. In an embodiment, the particular mapping function employed can be selected based upon information provided with the audio signal that provides an indication of the type of music included therein. Specifically, some pieces of music can include a tag or other information in the music, or associated therewith, that identifies the type of music. Such information can be used to select a mapping function that fits the style of music. The lighting programs can be authored on a different system and then transferred, via a computer-readable medium, to the mapping table in the apparatus.

A problem with such a system is that it is not very suited to re-creating the atmosphere at any performance venue. This would require that the same type of lighting system was in use at the performance venue, and that the user could obtain the lighting program used during the performance.

SUMMARY OF THE INVENTION

It is desirable to provide a method, system and computer program of the types mentioned above for providing an experience similar but not necessary identical to the atmosphere experienced at any venue.

This is achieved by the method of generating data for controlling a rendering system according to the invention, which includes:

obtaining data representative of a recording of at least intervals of an event, the recording having at least two components obtainable through different respective modalities;

analyzing the data to determine at least a dependency between a first and a second of the components; and using at least the dependency to provide settings for a system for rendering in perceptible form at least one output through a first modality in dependence on at least the settings and on at least one signal for rendering in perceptible form through a second modality.

In the present context, the term modality is used in the sense in which it is used to characterize human-computer interaction, viz. to denote a sense through which a human can receive the output of a computer and to denote a sensor or device through which the computer can receive input. In particular, the modalities include the vision modality, audition modality and haptic modalities.

By obtaining data constituting a recording of at least intervals of an event, the recording having at least two components obtainable through different respective modalities, the method presented herein can be used to re-create a large range of experiences, including those not involving computer-generated lighting shows. The method is independent of the inputs used to create these original experiences at the event venue, since it relies on a recording of perceptible aspects of the event (for example sound, light, vibrations, temperature, etc.). Analyzing the data to determine at least a dependency between a first and a second of the components and using at least the dependency to provide settings for a system for rendering at least one signal through a first modality in dependence on at least the settings and at least one signal for rendering in perceptible form through a second modality makes it possible to create a similar but not identical experience to that of the event. The experience will be more or less identical if the at least one signal for rendering in perceptible form through a second modality (e.g. an audio signal) corresponds to a recording made during the original event. However, by choosing a different signal (e.g. a different piece of music in the case of an audio signal), the atmosphere can be re-created without having to copy the event. For example, the ambient lighting conditions can be re-created without resorting to the playback of an audiovisual recording of the event. This makes the method relatively versatile. Furthermore, compared to e.g. merely recording the lighting conditions and reproducing them whilst playing back a different piece of music to that performed at the event, the method generally avoids dissonance between what is rendered through the first modality and what is rendered through the second modality, because settings are provided for a system rendering at least one signal through a first modality in dependence on both the settings and at least one signal for rendering in perceptible form through a second modality. A further effect achieved with the method is that it is not reliant on a complete recording of an event, since in many implementations of the method the recording need only be sufficiently complete to determine the dependency relatively accurately.

In an embodiment, at least one of the components is obtained by intermittently recording captured data obtained using at least one sensor at a venue of the event.

This allows the recording to be obtained efficiently and in an unobtrusive way. There is no need for continuous recording, so that a device with a lower data recording capacity can be used. In implementations a battery-powered recording device can be used, enabling unobtrusive recording.

In a variant, at least the intermittent recording is triggered at least partly on the basis of input from a sensor at the venue of the event.

An effect is that it is possible to ensure that recordings are made whenever at least one of a change, a trend, the exceeding of a fixed or variable threshold value, a particular constellation of multiple sensor inputs etc. is detected. Thus, indicators of characteristic values or changes in values of one or more of the components are used to trigger the recording of one or more of the components.

In a further variant, the trigger is based on at least one aspect of the physiology of at least one person present at the event, determined on the basis of input from at least one sensor for monitoring the at least one person.

An effect is to allow for more accurate re-creation of the atmosphere at the event venue. Those aspects of the atmosphere that brought about a noticeable reaction in those present at the event are captured and recorded, and they form the basis for determining the dependence that will be used to render at least one signal to re-create a similar atmosphere.

In an embodiment of the method, at least one of the components of the recording includes image data.

Thus, an aspect that is strongly characteristic of the atmosphere at an event is used to re-create a similar atmosphere, making this implementation of the general method quite effective.

In a variant, the image data is obtained using a camera with a wide-angle lens.

A camera with a wide-lens has a lens with a focal length substantially shorter than that of a lens for producing a rectilinear image with the dimensions of the image sensor in the image plane of the lens. This causes distortion, but the purpose of the video data is only to capture lighting characteristics. The use of the wide-angle lens makes it less likely that what is captured is actually an image of persons moving in a room, instead of the ambient lighting conditions that are needed to re-create the atmosphere in the room.

In an embodiment, the image data is obtained using a camera with a lens, the lens being directed at least partially upwards to obtain the image data.

An effect is to increase the likelihood that the settings are based on the ambient lighting effects, and not, for example, on the color of clothing of persons walking past.

In an embodiment of the method, analyzing the data further includes analyzing at least part of the data corresponding to at least one of the components to determine a value of at least one parameter characterizing the component concerned, and using the at least one value to select at least one of: a) the at least one signal for rendering in perceptible form through the second modality; and b) data included in the settings.

This embodiment recognizes that is often not sufficient to use only the relation between components of a recording of an event that are obtainable through different modalities for the re-creation of the atmosphere at the event. For example, knowledge of how the lighting at a salsa party is related to the music is not sufficient if this knowledge is used to provide lighting effects to accompany hard rock music. Also, some lighting effects are very characteristic of an event but weakly related to the music performed at the event.

A variant of this embodiment includes searching a collection of content data items for content data items characterized by parameter values similar to those of the analyzed component according to a certain distance metric, so as to form the signal for rendering in perceptible form through the second modality.

An effect is that one can re-create an atmosphere without exactly re-creating the event. Moreover, a short recording of an event can be used to re-create the atmosphere at the event for a much longer period of time without creating the impression of repetitiveness.

An embodiment of the method of generating data for controlling a rendering system includes causing the system for rendering in perceptible form at least one output through a first modality to operate in dependence on the settings and at least one signal for rendering in perceptible form through a second modality, the at least one signal for rendering in perceptible form through a second modality being of longer duration, when rendered, than the recording of at least intervals of the event.

An effect is that one can re-create a similar atmosphere to that of the event, without becoming repetitive, and without necessarily using a long recording. The settings can be based on a recording of a few relatively short but characteristic intervals. The signal for rendering in perceptible form through a second modality determines the duration of the re-created atmosphere. Through this signal, a variable element is added that avoids repetitiveness.

According to another aspect, the system for generating data for controlling a rendering system according to the invention includes:

an interface for obtaining data representative of a recording of at least intervals of an event, the recording having at least two components obtainable through different respective modalities;

an analysis module, configured to analyze the data to determine at least a dependency between a first and a second of the components; and a control data generation module, configured to use at least the dependency to provide settings for a system for rendering at least one output through a first modality in dependence on at least the settings and at least one signal for rendering in perceptible form through a second modality.

The system may be comprised in a home entertainment system receiving recordings through an interface in the form of e.g. a video of a live event or a data carrier comprising data captured using a specially adapted recording device. The system may alternatively be comprised in such a specially adapted recording device, providing settings in the form of control data on a data carrier or via a network link in a format suitable for use in a system comprising at least a media player and an ambient system.

In an embodiment, the system is configured to execute a method according to the invention.

According to another aspect of the invention, there is provided a computer program including a set of instructions capable, when incorporated in a machine-readable medium, of causing a system having information processing capabilities to perform a method according to the invention.

BRIEF DESCRIPTION OF THE DRAWINGS

The invention will be explained in further detail with reference to the accompanying drawings, in which.

DETAILED DESCRIPTION

Figure 1:
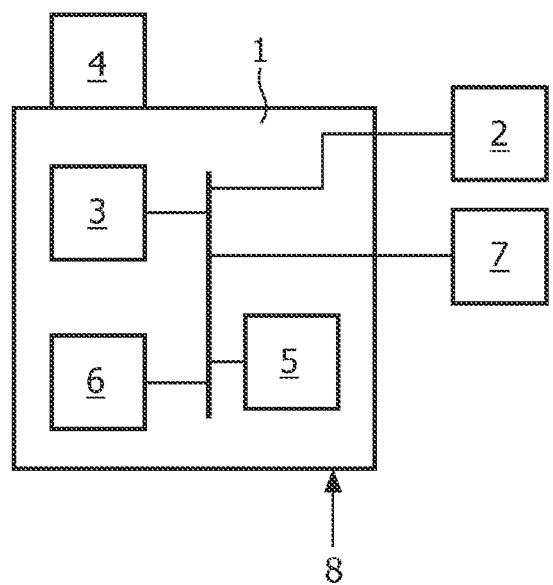
FIG. 1 is a diagram providing a very schematic illustration of an apparatus for capturing audio and lighting at an event.

In the following, systems will be discussed for use in a scenario in which a person visits an event at which recorded or live music is played and wishes to re-create the experience at a later point in time. To this end, the person may use a recording apparatus 1 at the event to capture the sound and some other perceptible aspect of the atmosphere, in particular the lighting pattern, for at least parts of the duration of the event. However, it is noted that the method of re-creating the atmosphere may also be carried out on the basis of a video, e.g. a video of a live concert, not attended by that person, particularly if the ambient lighting patterns at the event are adequately represented in the video.

In the illustrated embodiment, the recording apparatus 1 comprises a microphone 2, an image sensor 3 and a wide-angle lens 4. It may also or alternatively comprise a further sensor for generating a signal representative of a further perceptible environmental variable, such as temperature, humidity, visibility, acceleration (to capture vibration), etc. The recording apparatus 1 operates under the control of a data processing unit 5 comprising or interfacing with memory (not shown) to execute routines with which it has been programmed.

A read/write unit 6 is provided to write data to a data storage medium (not shown). In alternative embodiments, the recording apparatus 1 is comprised in or linkable to a wireless communication device such as a mobile telephone or a computing device with a wireless network interface. Thus, the recording apparatus 1 may be, or may comprise, a portable device. To make the recording apparatus 1 simpler and more comfortable to use, it is preferably battery-powered. Features are provided to conserve battery power and make more efficient use of the storage capacity of the medium used in conjunction with the read/write unit 6, as will be described.

The recording apparatus 1 further interfaces to a sensor 7. In one embodiment, the sensor is worn by a person attending the event, or at least arranged to monitor such a person. In particular, the sensor may be arranged to measure temperature, heartbeat, galvanic skin response or some other psychophysiological signal for determining whether the person monitored is exhibiting an emotional response. The sensor 7 may alternatively or additionally monitor some other aspect of the user. For example, an accelerometer can be used to characterize the movements of the user (whether he or she is sitting still, dancing, gesturing, etc.). Alternatively or additionally, the sensor 7 or a further sensor may monitor at least one environmental condition, such as temperature, humidity, noise level, visibility, etc.

The recording apparatus 1 described here by way of example captures the ambient lighting conditions using the digital camera constituted by the image sensor 3 and wide-angle lens 4. The recording apparatus 1 comprises a base 8, for placement on a support surface (not shown). The recording apparatus 1 is configured such that the lens 4 is directed at least partly away from the support surface, i.e. towards a ceiling or an upper region of a large wall. This ensures that the colors of objects and people at the event dominate the captured image data. Thus, the lighting effects (lighting amplitude, colors and the dynamics thereof) at the event venue are recorded relatively accurately. This effect is enhanced by the use of the wide-angle lens 4 with a relatively large field of view.

In order to preserve battery power and recording capacity, and also to reduce the amount of post-processing required, the sound and/or image data are recorded intermittently. Short intervals over which a recording is made are interspersed with larger intervals over which no recording is made. The image data and/or sound data may still be captured during these longer intervals. The lengths of the recording intervals can be pre-determined, dependent on characteristics of at least one of the captured signal or dependent on the relation between characteristics of at least two of the captured signals. For example, the recording interval can be longer where the image data does not appear to show a clear pattern, appears to be periodic with a longer period, etc. The intervals over which no recording is made can be of pre-determined duration, which can be constant or varying. In another embodiment, user controls (not shown) are provided to allow a user to trigger the start of a recording interval. In the illustrated embodiment, however, the recording is triggered at least partly on the basis of input from at least one of the sensor 7, the microphone 2 and the image sensor 3.

Where the recording is triggered on the basis of input from the sensor 7 and the sensor 7 is configured to measure at least one aspect of the physiology of at least one person present at the event, the trigger can be based on a physiological reaction of that person to the event. For example, the detection of an increase in heart rate or blood pressure or a particular galvanic skin response indicative of emotional involvement can trigger the recording. Where the sensor 7 is suitable for monitoring motion of one or more persons, the trigger can be based on the detection of a pattern of motion consistent with dancing or a change in such a pattern of motion. In this embodiment, and especially if the recording apparatus 1 is not positioned on its base 8 but carried, correction of the captured video data to take account of the motion can be carried out. This improves the accuracy with which the lighting pattern is captured and recorded.

An additional or alternative basis for a trigger can be the detection of a change in characteristics of the captured sound and/or ambient lighting. In this embodiment, the data processing unit 5 will carry out at least a rudimentary analysis of the sound signal or video data, generally over a moving window of time. Thus, each time at least one of the sound level, the music type, characteristics of the ambient lighting and the relationship between the sound signal and the video signal changes, a recording is triggered. In a simple embodiment, the amplitude of the signal captured by the microphone 2 can serve as the basis for the trigger. In a more sophisticated embodiment, changes in the tempo, beat, genre or the start of a new piece of music can be detected by the data processing unit 5, and serve as the basis for the trigger to start recording. Similarly, the overall light intensity or changes in the overall light intensity can be used as the basis for providing a trigger.

The data processing unit 5 can, in some embodiments, carry out a preliminary analysis of the captured video data so that only the results of this analysis are recorded. For example, instead of storing complete images, the recording apparatus 1 can store only the color histogram for each image, together with the temporal changes in the overall light intensity.

In the illustrated embodiment, the image data samples are recorded and analyzed at a later stage. The analysis can include the creation of a color histogram. This is facilitated if the image data is recorded in a suitable color space, such as YU'V'. The YU'V' color space, using a luminance component and two chrominance components to encode an image, already has a clear separation between luminance and chrominance, making the creation of a histogram easier.

Figure 2:
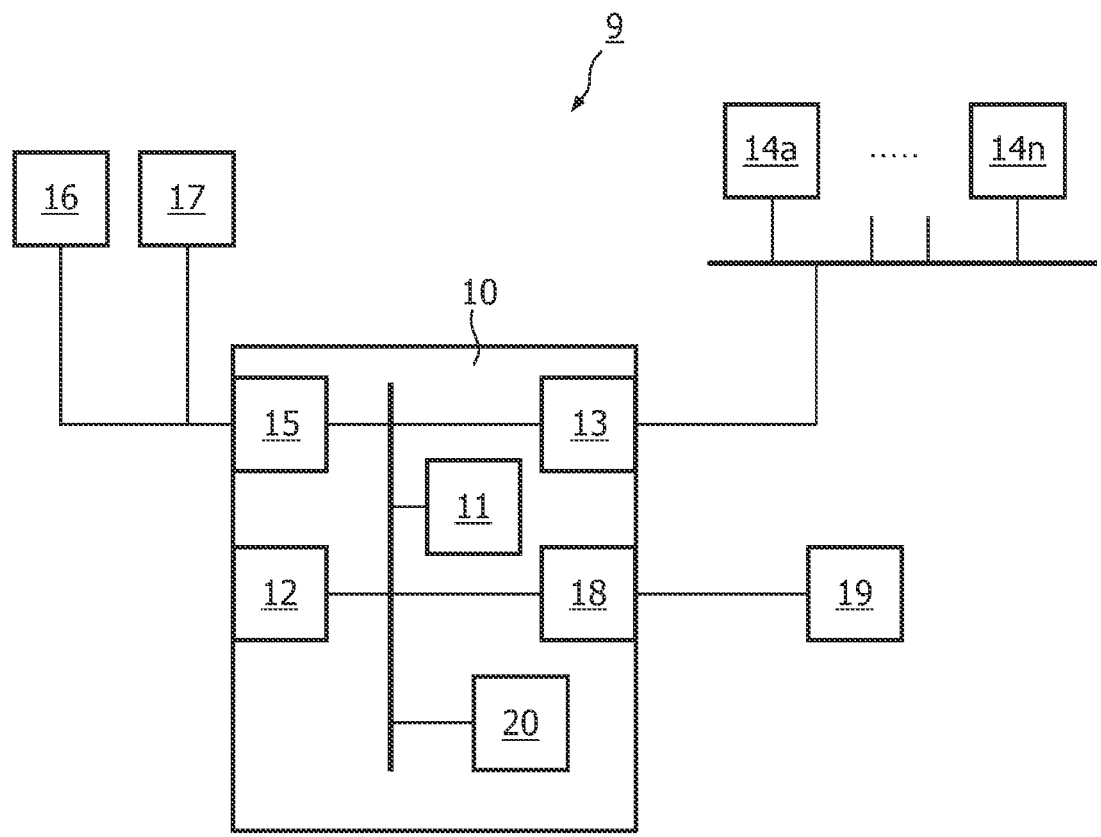
FIG. 2 is a diagram providing a very schematic illustration of a system for rendering content data with accompanying immersive effects.

Referring to FIG. 2, a rendering system 9 for use in the home environment comprises a base station 10. The base station 10 comprises a data processing unit 11 configured to control its operation in accordance with certain settings, which it infers at least partly from the data captured and recorded by the recording apparatus 1. These settings are for use in controlling a rendering system for rendering music and ambient lighting effects.

The base station 10 comprises a read unit 12 for reading data from a data storage medium compatible with the read/write unit 6 comprised in the recording apparatus 1. The base station 10 further comprises a lighting system interface 13 for providing control signals to ambient lighting devices 14*a-n*. These control signals control at least the light intensity, but generally also the color of light, depending on the capabilities of the lighting device 14 concerned. The base station 10 illustrated in FIG. 2 also comprises a schematically indicated sound reproduction device 15, which interfaces with loudspeakers 16,17. The sound reproduction device 15 can be configured to render music files, recorded music from CD or DVD, etc. In the illustrated embodiment, the base station 10 further includes an interface 18 to a device 19 for providing an immersive effect, e.g. tactile feedback, an effect influencing the spatial distribution of light, etc.

The base station 10 is also provided with a data storage device 20 for storing recordings of a number of music tracks.

Figure 3:
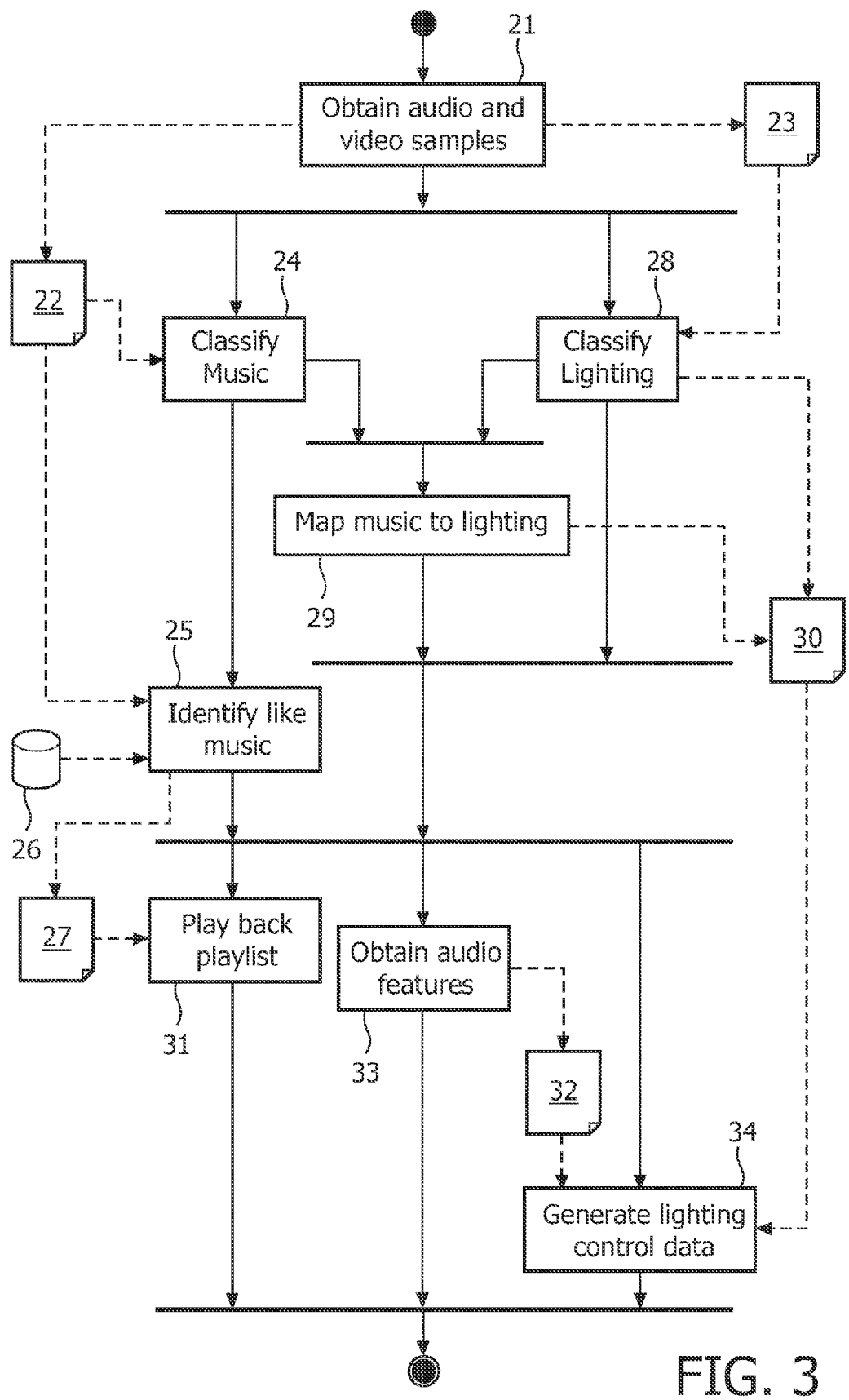
FIG. 3 is a flow chart showing steps in a method of reproducing the atmosphere at an event.

Steps carried out by the base station 10 are illustrated in FIG. 3. First (step 21), the samples of audio data 22 and video data 23 recorded by the recording apparatus 1 are read from a recording medium.

At least part of the audio data 22 is analyzed (step 24) to determine a value of at least one parameter characterizing the audio signal. The parameter values are used in a music classification algorithm for classifying the music concerned on the basis of audio features such as volume, meter, tempo, beat (dominant frequency) Mel Frequency Cepstral Coefficients, etc. The results of the analysis are used in a next step 25 to search a database 26 of audio tracks for audio tracks characterized by parameter values similar to those of the analyzed audio recordings according to a certain distance metric. Thus, a playlist 27 of similar audio tracks is compiled in these steps 24,25. The time required to play back the audio tracks on the playlist 27 is generally much longer than the lengths of the audio excerpts represented by the audio data 22 received in the first step 21 illustrated in FIG. 3.

In the illustrated embodiment, analysis of the video data 23 (step 28) is also concentrated in the base station 10. In another embodiment, is may be carried out partially or completely in the recording apparatus 1, incidentally, so that analysis results are obtained in the first step 21 and analysis steps 24,28 of only the audio and video data in the base station 10 are generally omitted.

The step 28 of analyzing the video data 23 involves a derivation of illumination characteristics from the recorded video/lighting patterns. Because the lens 4 is oriented generally upwards during recording, the analysis assumes that objects are largely absent from the video data 23. Otherwise, video processing to recognize and remove objects can be carried out.

One aspect of the analysis involves a determination of the dominant colors in the video frames. A method to extract the dominant colors from a video frame is to create a three-dimensional histogram of the colors in an appropriate color space. In this histogram, local maxima are detected. Subsequently, the width of the peak of the local maximum can be determined. The integrated histogram value in the area under the peak according to this width is an indication of the dominance of the color in the video frame. The measure is used to rank the colors, allowing the most dominant colors to be determined. Additional post-processing allows for some checks of the results to be carried out. Skin colors can be discarded, for example, to ensure that the dominant colors are those of the background lighting. If a lively effect is desired, then only saturated colors can be taken into consideration.

A further aspects of the analysis carried out in this step 28 involves determining the shapes of color spots in the video frames. Using the extracted dominant colors and their spread in the histogram, video frames can be segmented into individual color spots. That is to say that a background-foreground separation is carried out. A connected component analysis is carried out on the segmented image to obtain separately labeled blobs. These are then analyzed geometrically to determine, for example, the position of the centroid of the blob; the length, position or orientation of the major axis and/or minor axis of the blob; the orientation of the blob; and/or the eccentricity of the blob. In this way, circular spots can be distinguished from lines or oval spots. Furthermore, the spatial distribution of the blobs and/or characteristics of the blobs can be determined. All these analyses can be carried out separately for each of a set of colors comprising certain pre-determined colors and/or the dominant colors, for example.

An additional aspect of the analysis of the video data 23 carried out in this step 28 involves an analysis of the temporal development of at least one characteristic of the video data over an interval of time corresponding to at least part of a recording interval.

In particular, a change in brightness of a color can be tracked. The frequency of change is one characteristic of the lighting pattern.

A change in chrominance can also be tracked over time. Using the YU'V' color space as an example, newly detected (U',V') points can be linked to a close (U',V') point. Assuming that the recording apparatus 1 was stationary, or that motion of the apparatus has been compensated for by means of appropriate video processing, spatial information can be used to determine at least one characteristic of the dynamics of the lighting effects. For example, the location of the centre of mass of a particular color can be tracked. Alternatively or additionally, changes in spot shape or the distribution of spots over time can be characterized. For example, the analysis can be used to detect that a spot is becoming more elongated or that spots are merging. Furthermore, movement of the position of the centroid of a color region can be determined and quantified. This provides an approximation of the movement of a light beam at the venue of the event of which the video data 23 is a recording. The shape of the locus of the beam spot and the speed or frequency of movement along the locus are useful characteristics of the lighting pattern.

In a next step 29, a dependency between the recorded audio data 22 and the recorded video data 23 is determined, generally over time. This step 29 involves, for example, determining the relation between the beat of the music to the temporal frequencies in the lighting signal. Furthermore, the genre of the music can be linked to the type of lighting, e.g. to the brightness variations, the overall brightness, etc. The frequency and genre of the music can be determined on the basis of metadata associated with the music in the playlist 27 or derived by analyzing the sound signal itself. The mapping step 29 results in a set of data 30 representative of settings for the lighting control system comprised in the base station 10. The data 30 representative of settings also include data determined by analyzing (step 28) only the recorded video data 23.

To create an atmosphere similar to the one at the event, the playlist 27 is played back (step 31). A signal 32 representative of at least one audio feature characteristic for the audio track currently being played back is obtained (step 33). This data 32 is used to generate (step 34) lighting control data and data for controlling the device 19 for generating a further immersive effect, using the data 30 representative of settings generated on the basis of the analysis of the recording of the event. Thus, the lighting patterns created by the lighting devices 14a-n during playback of the audio tracks on the playlist 27 are in line with the illumination patterns determined by analyzing the recorded video data 23 independently of the recorded audio data 22, and they are in line with the relationships between the music and the illumination at the event. They are also adapted to the audio track actually being played back, which generally does not correspond exactly to the music recorded at the event venue. In particular, the lighting patterns match the beat, rhythm and flow of the audio track actually being rendered. As a result, the lighting patterns generated under the control of the base station 10 are similar but not identical to the lighting patterns of the event on which they are based. They are in any case of a longer duration than the recordings obtained from the recording apparatus 1. In certain embodiments, random variations are added to the lighting patterns to decrease the likelihood of repetitions even further.

It should be noted that the above-mentioned embodiments illustrate, rather than limit, the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

In an alternative embodiment, the recording apparatus 1 is comprised in, or connected to, another device, e.g. a mobile phone or portable media player. In a further alternative, the recording of at least intervals of an event is transmitted from the recording apparatus 1 to the base station 10 via a network link. In a further alternative, the analysis steps 28,29 are used to generate scripts for an ambient system. Although the example of sound as second modality has been used above, video can be used instead. In particular, the results of the music classification step 24 can be used to retrieve audiovisual content items that match the characteristics of the recorded music at the event.

The invention claimed is:

1. A method of generating data for controlling a rendering system, the method comprising the acts of:
   obtaining data representative of a recording of at least intervals of an event, the recording having at least two components obtainable through different respective modalities;
   analyzing the data to determine at least a dependency between a first and a second of the components; and
   using at least the dependency to provide settings for a system for rendering in perceptible form at least one output through a first modality in dependence on at least the settings and on at least one signal for rendering in perceptible form through a second modality.

2. The method according to claim 1, wherein at least one of the components is obtained by intermittently recording captured data obtained using at least one sensor at a venue of the event.

3. The method according to claim 2, wherein the first component comprises audio data and the second component comprises visual data intermittently recorded by the camera at the event.

4. The method according to claim 2, wherein at least the intermittent recording is triggered at least partly on the basis of input a sensor at the venue of the event.

5. The method according to claim 4, wherein the trigger is based on at least one aspect of the physiology of at least one person present at the event, determined on the basis of input from at least one sensor for monitoring the at least one person.

6. The method according to claim 5, wherein the sensor is configured to sense a change in at least one of temperature, heart rate, blood pressure, galvanic skin response and movement of the person.

7. The method according to claim 1, wherein at least one of the components of the recording includes image data.

8. The method according to claim 7, wherein the image data is obtained using a camera with a wide-angle lens.

9. The method according to claim 7, wherein the image data is obtained using a camera with a lens, the lens being directed at least partially upwards to obtain the image data.

10. The method according to claim 9, wherein the image data comprising ambient lighting at the event, and the analyzing act comprises determining a dominant color in the obtained ambient lighting at the event.

11. The method according to claim 1, wherein the act of analyzing the data further includes analyzing at least part of the data corresponding to at least one of the components to determine a value of at least one parameter characterizing the component concerned, and
   using the at least one value to select at least one of:
   the at least one signal for rendering in perceptible form through the second modality; and
   data included in the settings.

12. The method according to claim 11, further comprising the act of searching a collection of content data items for content data items characterized by parameter values similar to those of the analyzed component according to a certain distance metric, so as to form the signal for rendering in perceptible form through the second modality.

13. The method according to claim 1, further comprising
   causing the system for rendering in perceptible form at least one output through a first modality to operate in dependence on the settings and at least one signal for rendering in perceptible form through a second modality, the at least one signal for rendering in perceptible form through a second modality being of longer duration, when rendered, than the recording of at least intervals of the event.

14. A system for generating data for controlling a rendering unit, the system including:
   an interface for obtaining data representative of a recording of at least intervals of an event, the recording having at least two components obtainable through different respective modalities;
   an analysis module, configured to analyze the data to determine at least a dependency between a first and a second of the components; and
   a control data generation module, configured to use at least the dependency to provide settings for the rendering unit for rendering at least one output through a first modality in dependence on at least the settings and on at least one signal for rendering in perceptible form through a second modality.

15. The system according to claim 14, wherein the first component comprises audio data and the second component comprises visual data intermittently recorded by a camera at the event.

16. The system according to claim 15, wherein at least the intermittent recording is triggered at least partly on the basis of input a sensor at the venue of the event.

17. The system according to claim 16, wherein the system comprises at least one sensor for monitoring at least one person, wherein the trigger based on at least one aspect of the physiology of the at least one person present at the event, determined on the basis of input from the at least one sensor.

18. The system according to claim 17, wherein the at least one sensor is configured to sense a change in at least one of temperature, heart rate, blood pressure, galvanic skin response and movement of the at least one person.

19. The system according to claim 14, wherein at least one of the components of the recording includes image data, wherein the image data comprises ambient lighting at the event, and the analysis module determines a dominant color in the obtained ambient lighting at the event.

20. A non-transitory computer readable medium embodying comprising computer instructions which, when executed by a processor, configure the processor to perform the acts of claim 1.

* * * * *